(12) United States Patent
Cherchali et al.

(10) Patent No.: US 6,847,704 B1
(45) Date of Patent: Jan. 25, 2005

(54) SELF-INSTALLABLE AND PORTABLE VOICE TELECOMMUNICATION SERVICE

(75) Inventors: Ali M. Cherchali, Jackson, NJ (US); James C. Ehlinger, Colts Neck, NJ (US); Marius Jonas Gudelis, Holmdel, NJ (US); William G. Lester, Cranford, NJ (US); Robert J. McLaughlin, Allentown, NJ (US)

(73) Assignee: AT&T Corp., New York, NY (US)

( * ) Notice: Subject to any disclaimer, the term of this patent is extended or adjusted under 35 U.S.C. 154(b) by 198 days.

(21) Appl. No.: 10/328,577

(22) Filed: Dec. 23, 2002

(51) Int. Cl.[7] .............................................. H04M 11/00
(52) U.S. Cl. ................. 379/93.05; 379/90.01; 379/221.13
(58) Field of Search ................ 379/90.01, 93.05–93.08, 379/93.14, 93.23, 93.25, 93.29–93.34, 221.13–221.15; 370/389, 356

(56) References Cited

U.S. PATENT DOCUMENTS 5,774,526 A * 6/1998 Propp et al. ............. 379/90.01
6,021,126 A * 2/2000 White et al. ............. 379/90.01
6,463,270 B1 10/2002 Chang et al.
6,473,503 B1 10/2002 Karau et al.
6,487,200 B1 * 11/2002 Fraser ........................ 370/389

* cited by examiner

Primary Examiner—Wing Fu Chan (57) ABSTRACT

An architecture and technique for creating self-installable and portable telephony (dial tone) service that can be moved between any two locations that has access to both a voice communication network and a data network. A telephony adapter is used as a subscriber premises device that is connected between a conventional telephone set and both a voice network and a data network. A provisioning server communicates with the telephony adapter through the data network and maintains a record of the subscriber's local telephone number and IP address of the telephony adapter. As the subscriber moves from one location to another, the telephony adapter (once turned "on") will communicate with the provisioning server and re-establish phone service, always using the same local phone number of the subscriber.

8 Claims, 6 Drawing Sheets

CALL TERMINATION FLOW
(TA TO TA)

*FIG. 6*

CALL TERMINATION FLOW
(TELEPHONE TO TA)

SELF-INSTALLABLE AND PORTABLE VOICE TELECOMMUNICATION SERVICE

TECHNICAL FIELD

The present invention relates to the field of telecommunication and, more particularly, to an apparatus and architecture allowing for self-provisioning and porting of telephone dial tone service.

DESCRIPTION OF THE PRIOR ART

With traditional telephone service, self-provisioning has always been—and will remain—an impossibility for most consumers. In today's telecommunication industry, a subscriber needs to go through an extended process to transfer or modify his service: call the service provider; set up an appointment for an installer to come to the residence, etc. Once the service is satisfactorily installed, moving the service to a new location basically means starting the process all over again. If self-provisioning and porting of dial tone telephone service were possible, it would be both beneficial to the consumer and efficient for the telecommunications company.

SUMMARY OF THE INVENTION

The need remaining in the prior art is addressed by the present invention, which relates to the field of telecommunication and, more particularly, to an apparatus and architecture allowing for self-provisioning and porting of telephone dial tone service from/to any location that has access to a high-speed data connection (e.g., cable, DSL, LAN or the like) which can provide access to the apparatus described below. This can take the form of a public or private IP network depending on the community to which the service is being made available. In the following example, a public network and a publicly-routable IP address is assumed. The apparatus and architecture of the present invention hereinafter referred to as "dial tone anywhere" (DTA).

In accordance with the teaching of the present invention, a telephony adapter (TA) device establishes a telephony service presence (i.e., dial tone) at the subscriber's location using the TA's unique Media Access Controller (MAC) address. A provisioning database is coupled to the IP network and maintains records of subscriber location and account information. Associated with each subscriber's record in the database is information regarding his local calling area, billing address, and the like. When the subscriber re-locates and connects his TA to a new data network, a new IP address for the TA will be assigned and forwarded to the provisioning database to be associated with the TA's MAC address. Thus, DTA service will be re-established automatically by the TA without any intervention by the subscriber, or by a telecommunications company customer service representative.

An aspect of the present invention is that the subscriber re-establishes dial tone and telephony service anywhere covered by a data network, while retaining both the original calling area(s) and local telephone number. Calls placed to/from this number will appear as local calls in the original local calling area. This local calling area, of course, can also be changed by the subscriber (via an authorized website, for example) to modify the calling area to be associated with the new physical location.

Other and further aspects of the present invention will become apparent during the course of the following discussion and by reference to the accompanying drawings.

BRIEF DESCRIPTION OF THE DRAWINGS

Referring now to the drawings.

DETAILED DESCRIPTION

"Dial tone anywhere" (DTA) service, in accordance with the present invention and as will be described in detail hereinbelow, allows the user to self-install phone service in any location that has access to a high-speed data connection (e.g., cable, DSL, LAN, etc.). Installing the service, via a "telephone adapter" coupled to the data connection, is considered to be relatively simple, as shown below, and can be completed in about a minute. Once the subscriber's account is established, the telephony adapter is easily ported to a new location, as long as there is a high-speed data connection that may be used to hook up to the DTA service. Whether this move is permanent, or just for a few days, the installation procedure remains the same. The billing information, local phone number, and free local calling area remain in place, unless the subscriber chooses to change them via, for example, a web interface.

In addition to portability of the physical device (by merely physically moving the telephony adapter (TA) from one location to another), the home calling area is also portable. The subscriber can have a local phone number (and associated free local calling area) anywhere in the country and, in fact, can even have more than one free local calling area. The home calling area portability is a useful feature if, for example, the subscriber moves to Los Angeles, but has a large number of family and friends in the Philadelphia area. The subscriber retains a "Philadelphia local number" so that calls to and from that area are considered local calls. The subscriber may also have family in Orlando, in which case, the subscriber can obtain a second local number in that area so that those calls are considered local as well.

When the subscriber moves the DTA service to a new residence, the free local calling areas stay the same, unless the subscriber requests a change. In the above example, the subscriber may decide to move to San Francisco, but desire to stay in touch with people in Philadelphia and Orlando. The subscriber would therefore leave the local calling area information the same. However, the subscriber may also change this information (using a secure website, for example), and request a change in local calling area via a self-service web page.

Initially, when an individual decides to subscribe to DTA service, the first step is to access a provisioning website, where the website can be reached using any conventional web browser. The subscriber will provide their billing/shipping address (es), billing method, feature choices, local calling area(s), etc. If the subscriber chooses to purchase the necessary equipment online, the appropriate device will be shipped directly to the shipping address. If the subscriber chooses to purchase the necessary equipment in a retail setting, then the website will recommend appropriate retail outlets and/or equipment make and model that will operate with the DTA service.

The TA device received by the customer will include a Wide Area Network (WAN) jack for connection to the subscriber's cable/DSL modem, a Local Area Network (LAN) jack for connection to the subscriber's PC, and a conventional telephone jack (RJ-11). Once the TA is connected appropriately and plugged into any conventional 110V electrical outlet, the provisioning and setup are fully automated, as discussed in detail below, and will be operational within minutes.

Once the TA is operational, the subscriber can make calls to anywhere in the world. The subscriber will have chosen one or more local areas in which to have a local phone number. When the subscriber makes calls to these areas (which can be anywhere in the country), or receives calls from these areas, the calls will be considered local. Calls to other locations outside of these local calling areas (including the current physical location of the subscriber) will be billed at long distance rates.

Figure 1:
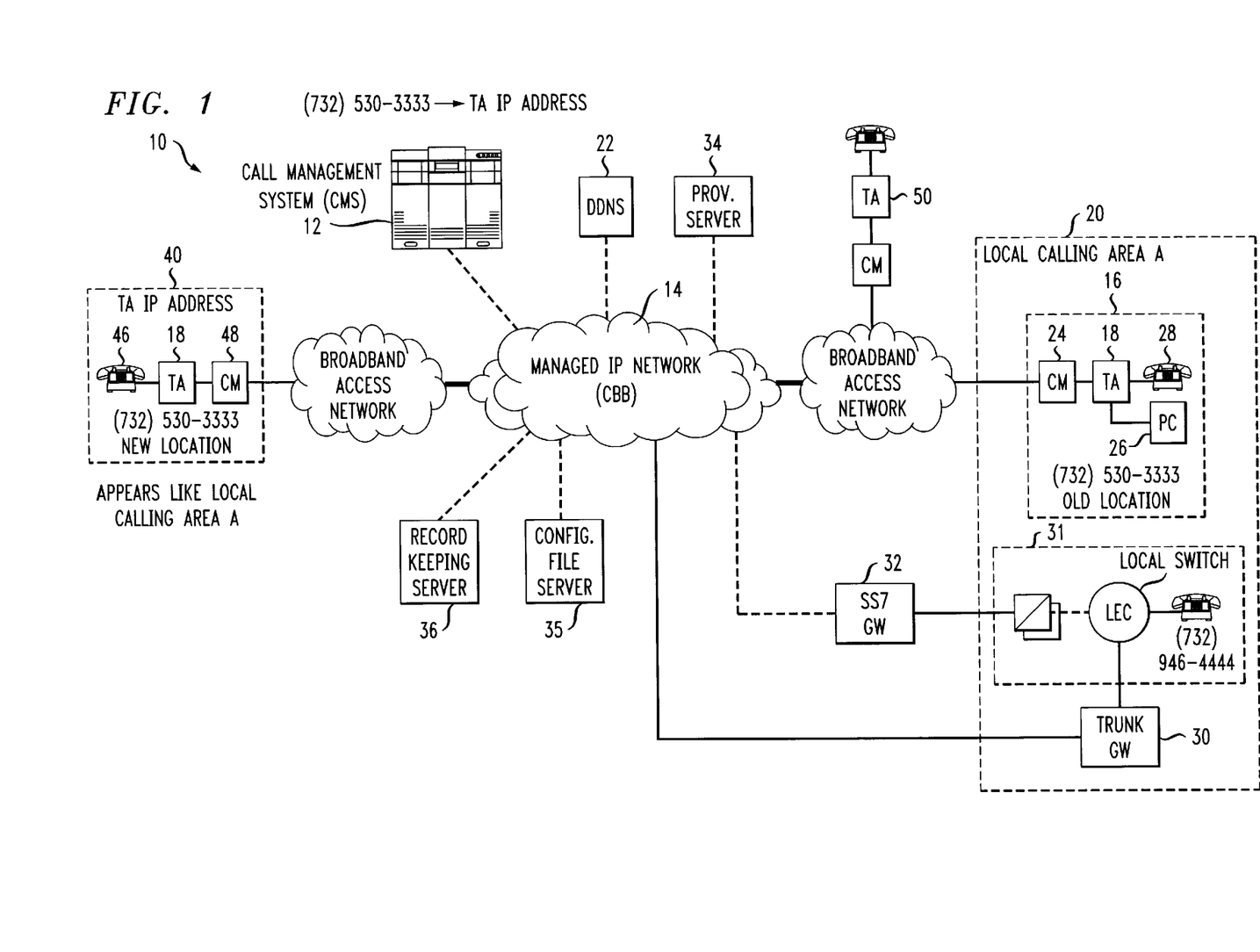
FIG. 1 illustrates an exemplary network architecture that may be used to support the "dial tone anywhere" service of the present invention.

FIG. 1 illustrates an exemplary network architecture 10 that may be used to implement the "dial tone anywhere" (DTA) service of the present invention. Referring to FIG. 1, a Call Management System (CMS) 12 is associated with a managed IP (data) network 14 and provides call control and signaling-related services for TA 18, PSTN gateway 30 and signaling gateway 32 in network 14. In accordance with the present invention, CMS 12 functions to map registered telephone numbers of DTA service subscribers into an IP address that will be associated with each TA. Referring to FIG. 1, a DTA service subscriber at a first location 16, including a TA 18, is illustrated as having local telephone number 732-530-3333. The associated local calling area 20 is also shown. It is the IP address that CMS 12 uses to route calls to/from the DTA customer at location 16. In most cases, since IP addresses can change often, CMS 12 actually keeps track of its subscribers using their Fully Qualified Domain Name (FQDN). CMS 12 relies on Dynamic Domain Name Server (DDNS) 22 for the most current mappings of FQDNs to IP addresses. CMS 12 then caches the FQDN to IP translation, and updates the cache each time there is an IP address update. This update is indicated to CMS 12 by TA 18, which then triggers CMS 12 to query DDNS 22 for the latest information.

As mentioned above, DDNS 22 is a critical element required to keep track of the changing IP addresses of the DTA subscribers. In particular, DDNS 22 maintains the definitive list of IP to FQDN mappings for the DTA service, and is used as the source to feed the updates to CMS 12, as needed. For this particular DTA service, DDNS 22 performs no other function, thus its only "customer" in architecture 10 is DTA CMS 12.

In accordance with the present invention, telephony adapter (TA) 18 is the customer premises equipment used in conjunction with an existing high-speed data modem (already present at the subscriber's location) to provide DTA service. As shown in FIG. 1, TA 18 is interconnected between a modem 24 (such as a cable modem) and a PC 26, and offers a standard telephone jack interconnection to a telephone set 28 (telephone set 28 associated with the subscriber's defined ANI of 732-530-3333). It is to be understood that the "TA functionality", as will be described in detail below, can be incorporated into either a modem or a PC, and need not always be formed as a stand-alone unit. TA 18 uses the public LP address offered by modem 24, and informs CMS 12 of its IP address, as will be described below in association with FIG. 2. In order to indicate to CMS 12 that the IP address is new, or has changed, TA 18 sends a special message at the end of the flow requesting CMS 12 to refresh its cache by dipping into DDNS 22. In operation, TA 18 will packetize outgoing voice communication, giving this information priority over other data being sent upstream by the subscriber (that is, data from the "PHONE" port of TA 18 will be given priority over data from the "PC" port). TA 18 then passes the voice information to modem 24 at the IP layer (OSI layer 3) and above. Indeed, TA 18 is essentially blind to the lower-layer protocols that are being used by modem 24, such as DOCSIS or DSL.

Referring again to FIG. 1, a trunk gateway switch 30 (also referred to in the art as a "media gateway"), provides bearer connectivity between IP network 14 and the public switched telephone network (PSTN) 31. For calls between the IP network 14 and the PSTN 31, trunk gateway 30 converts voice traffic to and from RTP packets (IP) to TDM format voice samples. The TDM interconnection may be signaled with ISDN PRI or SS7 signaling. In the case of an SS7 interconnection, a signaling gateway 32 supports SS7 signaling to and from the PSTN 31. A provisioning server 34 is used to collect the IP addresses of the various subscriber TAs, and to send back to those TAs the configuration information that they need to function as part of the DTA service. In accordance with the present invention, the TAs are pre-configured to query provisioning server 34 (via server 34's domain name) once the TA has acquired its public IP address. Provisioning server 34 uses the MAC address (or other unique information, such as a security key) of TA 18 to identify it as a legitimate subscriber. Once this is determined, provisioning server 34 sends the public IP address and the FQDN of TA 18 to DDNS 22 for use by CMS 12. In addition, provisioning server 34 sends the following information back to TA 18 (as described in detail below): (1) a Success/Fail flag representing the DDNS update; (2) the FQDN for TA 18; (3) the name of the configuration file that TA 18 needs to download; (4) the method that TA 18 should use to download this configuration file; and (5) the FQDN or IP address of the particular server 35 that contains the configuration file.

Provisioning server 34 will perform a similar function when updating the IP address that TA 18 might receive after an expired DHCP lease, as discussed below in association with FIG. 3. In this case, the new IP address and existing FQDN are still sent to DDNS 22, but there is no need to send return information to TA 18, as required in establishing a new service.

In accordance with the present invention, therefore, the ability of TA 18 to communicate with CMS 12 allows for the TA to be un-installed and re-installed at any location that offers a high-speed data connection, allowing the subscriber to provide dial tone service for himself without any need to involve service personnel of the telephone company. Referring to FIG. 1, when the subscriber moves to another location 40, service is provided by merely unhooking TA 18 at first location 16 and hooking up to telephone 46 and cable modem 48 at new location 40. As will be discussed in detail below, TA 18 then begins a re-install process by sending out a "discover" message, which leads to the XML service request being forwarded to provisioning server 34 and CMS 12, thus providing the same local telephone number and local calling plan for the subscriber. For all intents and purposes, telephone 46 coupled to TA 18, will send and receive telephone calls from its "old" local calling area 20 as if it had never been moved to location 40. Thus, a subscriber may re-locate from New Jersey to California and immediately reactivate telephone service using the same local number the subscriber had in New Jersey.

Figure 2:
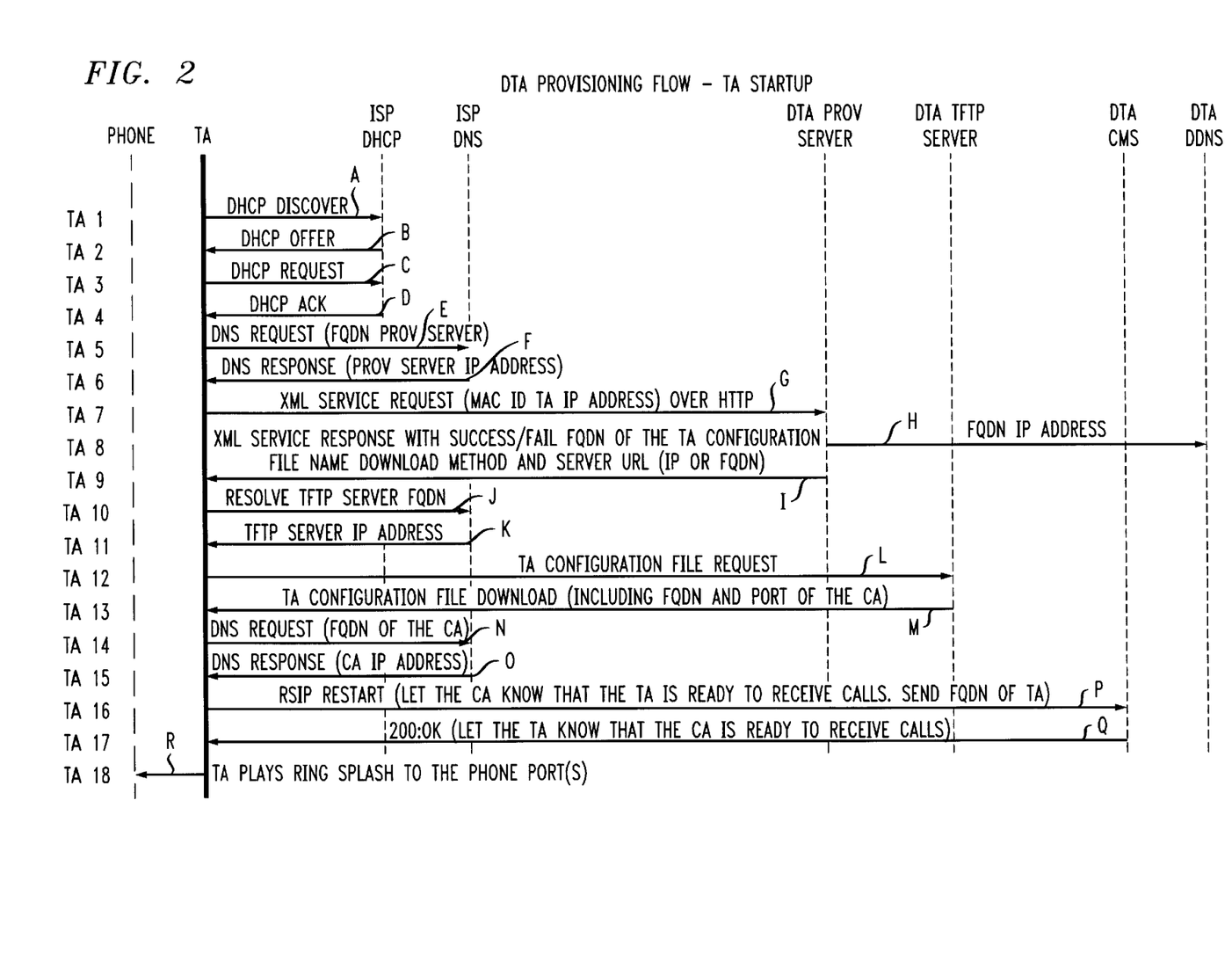
FIG. 2 illustrates an exemplary provisioning flow for establishing dial tone anywhere service.

FIG. 2 contains a provisioning message flow used by a telephony adapter (TA) of the present invention to initiate the inventive "dial tone anywhere" (DTA) service. In fact, this process is used when a TA is installed for the first time (such as at location 16 of FIG. 1), or moved to a new location, such as location 40 shown in FIG. 1. Referring to the provisioning flow, when a TA is first turned "on", it will send out a standard DHCP discover message to its associated ISP ("A" in FIG. 2), where the ISP responds with at least one DHCP offer ("B"). The TA then responds with an acceptance of the offered IP address, sending a Request message to this effect ("C"), which is then acknowledged by the ISP ("D"). TA 18 now has established its own public IP address. TA 18 comes equipped with the FQDN of DTA provisioning server 34 (resident in its memory), and at this point can now launch a DNS Request to the ISP DNS to resolve the FQDN of server 34 into an IP address ("E"). The ISP's DNS then returns the resolved IP address for DTA provisioning server 34 to the TA ("F").

At this point, TA 18 launches an XML service request ("G") to DTA provisioning server 34, where the encrypted message includes the MAC address of TA 18, as well as the public IP address given to TA 18 by the subscriber's ISP. Upon receipt of this request, DTA provisioning server 34 then verifies the MAC address of TA 18 against its internal accounting records and, if valid, forwards both the FQDN and IP address of TA 18 to DTA DDNS 22 ("H"), where DDNS 22 is used by DTA CMS 12, as mentioned above, in defining the location of the various TAs requesting service.

At the same time, DTA provisioning server 34 responds to TA 18 with another encrypted XML message containing the following elements: (1) a Success/Fail flag representing the update at DDNS 22; (2) the FQDN of TA 18; (3) the name of the configuration file that TA 18 needs to download; (4) the method that TA 18 should use to download this configuration file (e.g., ftp, tftp, http, etc); and (5) the FQDN or IP address of the server 35 containing the configuration file ("I"). TA 18 then sends a request to the ISP DNS to resolve the FQDN of the configuration file server ("J"), and the DNS then responds by sending the resolved IP address back to TA 18 ("K"). Using this IP address, TA 18 then sends a query to the proper server ("L") requesting the server to download its configuration file. The server then downloads the configuration file to TA 18, including the FQDN and proper port number of DTA CMS 12 ("M"). With this information, TA 18 then sends a request to the ISP DNS to resolve the FQDN of DTA CMS 12 ("N") and the ISP DNS responds with the resolved IP address for DTA CMS 12 ("0").

Once all of this address information has been transmitted and resolved, TA 18 then sends a RSIP Restart message to DTA CMS 12 to let it know that TA 18 is now "ready" to receive calls ("P"), where this message includes the FQDN of TA 18. DTA CMS 12 responds to TA 18 ("Q") with an "OK" message, where at this point TA 18 may play a "ring splash" to the connected telephone to indicate to the subscriber that the TA is operational and ready to receive/place telephone calls (denoted as "R", this last alerting step is considered to be optional).

Figure 3:
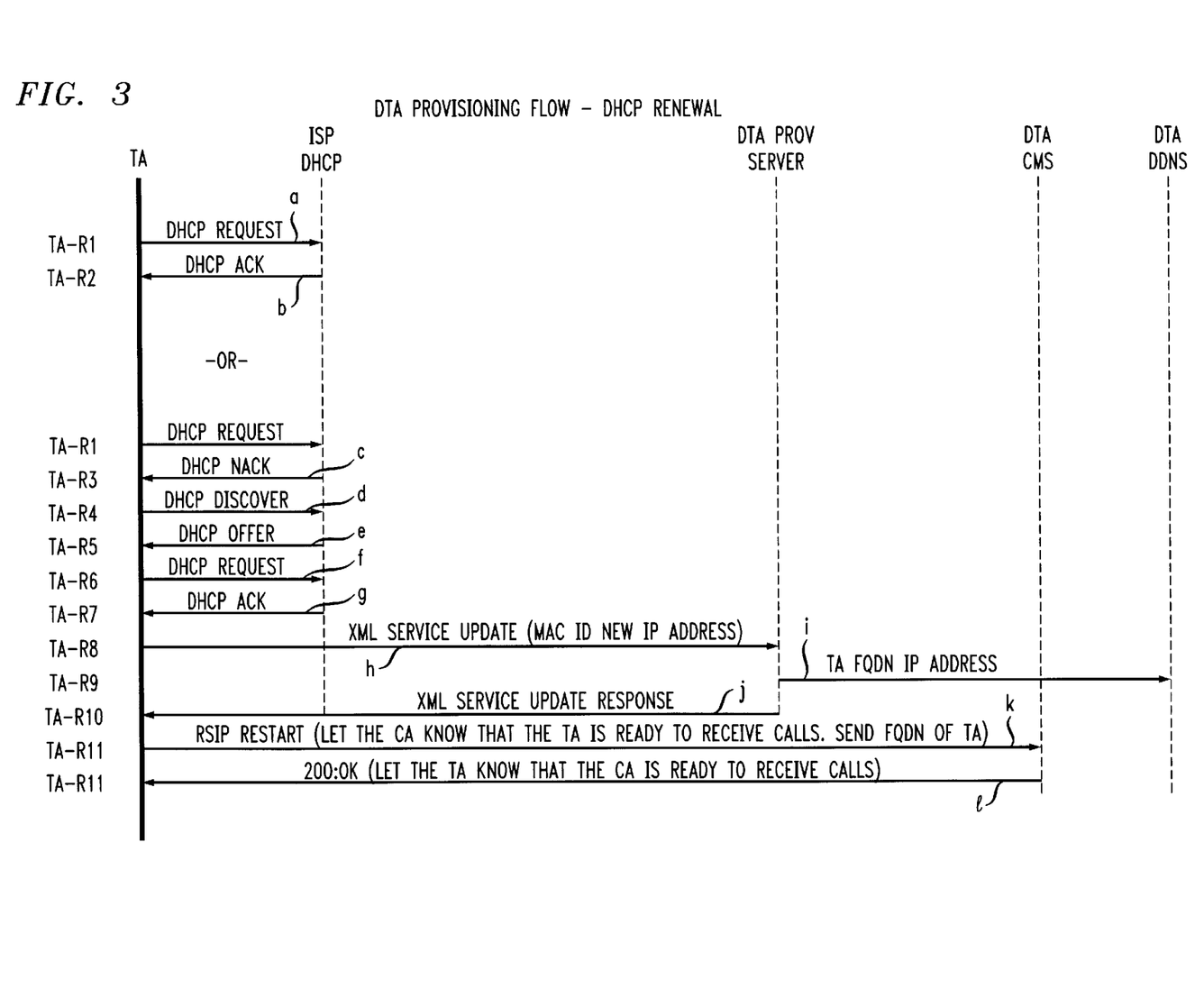
FIG. 3 contains a diagram of alternative flow processes for renewing the IP address associated with a telephony adapter in accordance with the present invention.

FIG. 3 contains a provisioning flow diagram used by a telephony adapter (TA) in order to renew an IP address (or obtaining a new IP address), illustrating alternative processes that can be used. In the simplest form of the process, TA 18 sends a DHCP request ("a") to its ISP DHCP, the request including the existing IP address for TA 18 in an attempt to renew the lease for this IP address. In this first case, the subscriber's ISP responds with an ACKnowledgement ("b") and renews the lease. Alternatively, the subscriber's ISP may choose not to allow the renewal of the same IP address ("c"), which then forces TA 18 to begin over with a DHCP Discover request ("d"). The subscriber's ISP then responds ("e") with a DHCP offer (or more than one offer) and TA 18 proceeds to accept one of the offered IP addresses ("f"), which is thereafter acknowledged by the ISP DHCP ("g") so that TA 18 again has a public IP address. At this point, TA 18 launches an XML service update ("h") to DTA provisioning server 34, where this encrypted message includes the MAC address of TA 18, as well as the new IP address. DTA provisioning server 34 then verifies the MAC address of TA 18 against its accounting records to see if it is a valid bid for service. Presuming the request is valid, provisioning server 34 forwards the FQDN and new IP address of TA 18 to DTA DDNS 22 ("i"). As described above, DDNS 22 is used by DTA CMS 12 to locate the various TAs requesting service. DTA provisioning server 34 also functions to transmit a return encrypted XML message to TA 18 ("j"), containing the Success/Fail flag representing the DDNS update. Since TA 18 is already configured and active, no other information is required to be contained in this XML message. Once the updated IP address information has been transmitted, TA 18 will sends a RSIP Restart message to DTA CMS 12 to let it know that TA 18 is again "ready" to receive calls ("k"), where this message includes the FQDN of TA 18. DTA CMS 12 responds to TA 18 ("1") with an "OK" message.

With this understanding of the provisioning flow for starting/renewing the operation of a telephony adapter (TA) in accordance with the present invention, it is now possible to describe the call flow associated with using "dial tone anywhere" (DTA) service in accordance with the teachings of the present invention. In particular, FIG. 4 contains a flowchart associated with an exemplary call set-up process when a telephone call originates from a telephone coupled to a TA, such as telephone 46 and TA 18 as shown in FIG. 1, using Packet Cable NCS call flow processing as an example. It is to be understood that any standard VoIP signaling protocol may be used in implementing DTA service in accordance with the present invention, such as MGCP, NCS, SIP, and the like, with the particular signaling protocols and call flows as described in FIGS. 4–6 as just one particular embodiment of the service of the present invention. The call set-up process begins with the subscriber going off-hook (step 100), which causes TA 18 to send an MGCP off-hook message (step 110) to CMS 12 (see FIG. 1). In response, CMS 12 sends an MGCP response message to TA 18, instructing TA 18 to play "dial tone" for telephone 46 and collect the digits upon dialing by the subscriber (step 120). The subscriber then dials the called party's number and TA 18 collects the digits and forwards the digits in an MGCP message to CMS 12 (step 130). CMS 12 then transmits an MGCP "create connection" message with the SDP profile to TA 18 (step 140), requesting TA 18 to set up a half-duplex connection and report the next "on-hook" event to CMS 12 (i.e., report when the phone call is completed).

Figure 4:
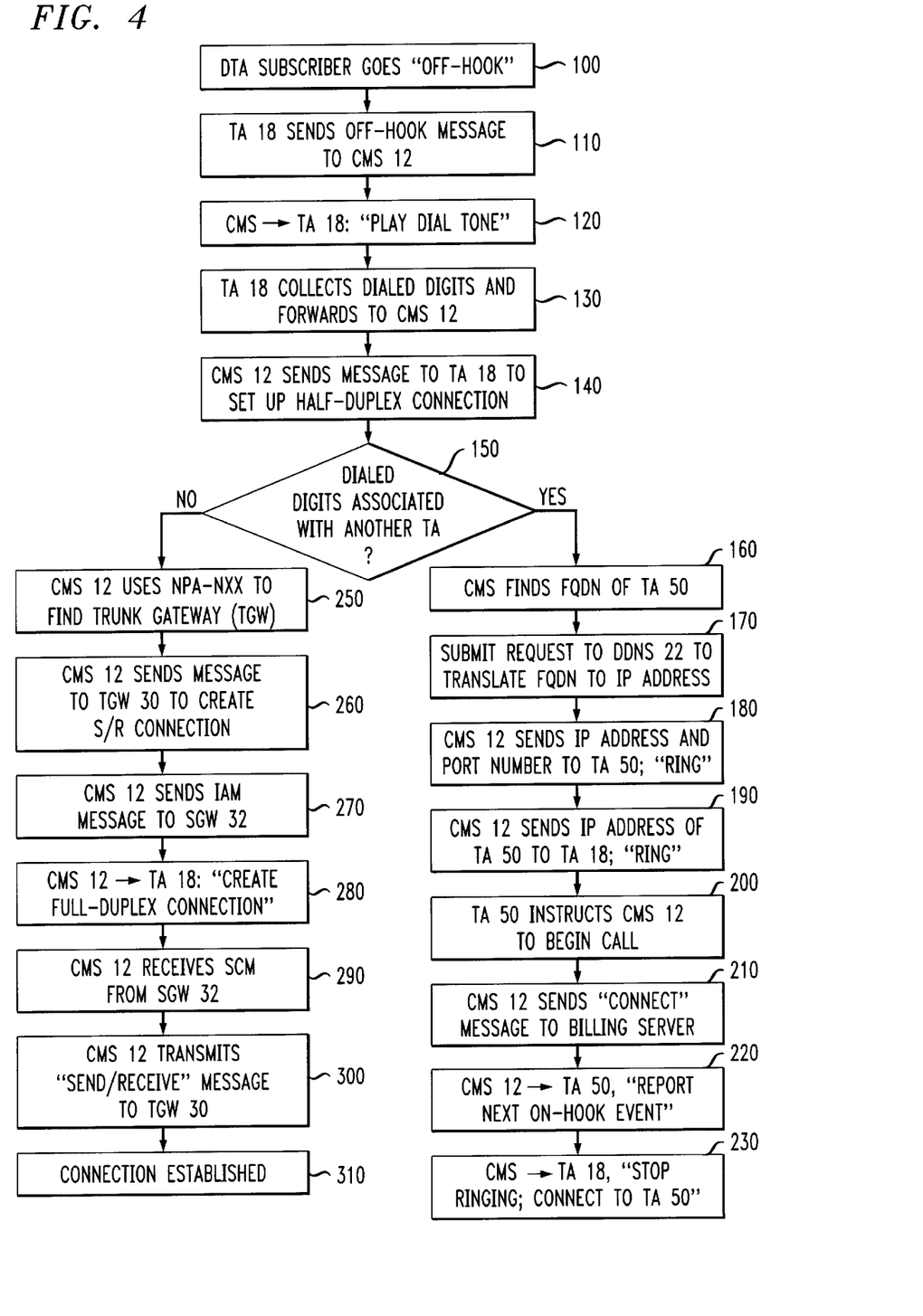
FIG. 4 contains a flowchart of an exemplary call set-up flow, following Packet Cable NCS standards, using a telephony adapter in accordance with the present invention.

A decision is then made to determine if the dialed digits are associated with another telephony adapter, or with a PSTN telephone set. Presuming that the dialed digits are associated with another TA (hereinafter referred to as TA 50, with the call referred to as an "on-net" to "on-net" call), CMS 12 then proceeds to associate a FQDN and associated port number based on the dialed digits received (step 160). CMS 12 then sends a request to DDNS 22 to translate this FQDN into an IP address that will be used to establish communication with TA 50 (step 170). With this information in place, CMS 12 then sends an MGCP create connection message (with proper IP address and port number) followed by a Request for Notification (RQNT) message to provide ringing, to TA 50, instructing TA 50 to begin ringing (step 180). Subsequent to this transmission, CMS 12 then sends an MGCP "modify connection" message to TA 18, the message including the IP address of TA 50 and an instruction to generate a "ringing" tone (step 190).

When the called party answers the phone (i.e., goes "off-hook"), TA 50 sends an MGCP message to CMS 12, indicating that the call should begin (step 200). CMS 12 then sends an accounting "Connect" message to Record Keeping Server (RKS) 36 (step 210), and instructs TA 50 to report the next "on-hook" event (step 220), i.e., when the called party hangs up. At this point, CMS 12 then sends an MGCP "Modify Connection" message to TA 18 (step 230), instructing TA 18 to stop sending ringing tones and to make the send/receive connection full duplex. At this point, the calling and called parties are in full communication and can carry on their telephone conversation.

Returning to step 150, it is now presumed that TA 18 is calling out to a telephone not connected to another TA (i.e., an "on-net" to "off-net" call). In this case, CMS 12 analyzes the dialed digits (step 150) and determines that this particular telephone number has no association with an FQDN and port number (as another TA would). Therefore, CMS 12 uses the collected digits to determine the proper trunk gateway (such as, for example, trunk gateway 30 illustrated in FIG. 1) to handle the call (step 250). CMS 12 then sends a TGCP message, with the information of TA 18, to the selected trunk gateway (step 260), instructing it to create a send/receive connection. CMS 12 also starts a conventional PSTN connection by sending an IAM message (step 270) to the signaling gateway 32. CMS 12 then sends an MGCP "modify connection" message to TA 18, instructing TA 18 to switch from half-duplex to full-duplex mode (step 280). At some time during this process, CMS 12 receives an ACM (ISTP) message from the signaling gateway (such as signaling gateway 32 illustrated in FIG. 1) (step 290), indicating that call set-up to the called party has been completed. At this point, CMS 12 then sends an MGCP message (including the information associated with TA 18), to the trunk gateway (such as trunk gateway 30), instructing trunk gateway 30 to create a send/receive connection (step 300). Following this, when the called party goes off-hook, CMS 12 will receive an ANM (ISTP) message (step 310), causing CMS 12 to send an "event connect" message to RKS 36 and allow the telephone conversation between the calling and called parties to begin.

Figure 5:
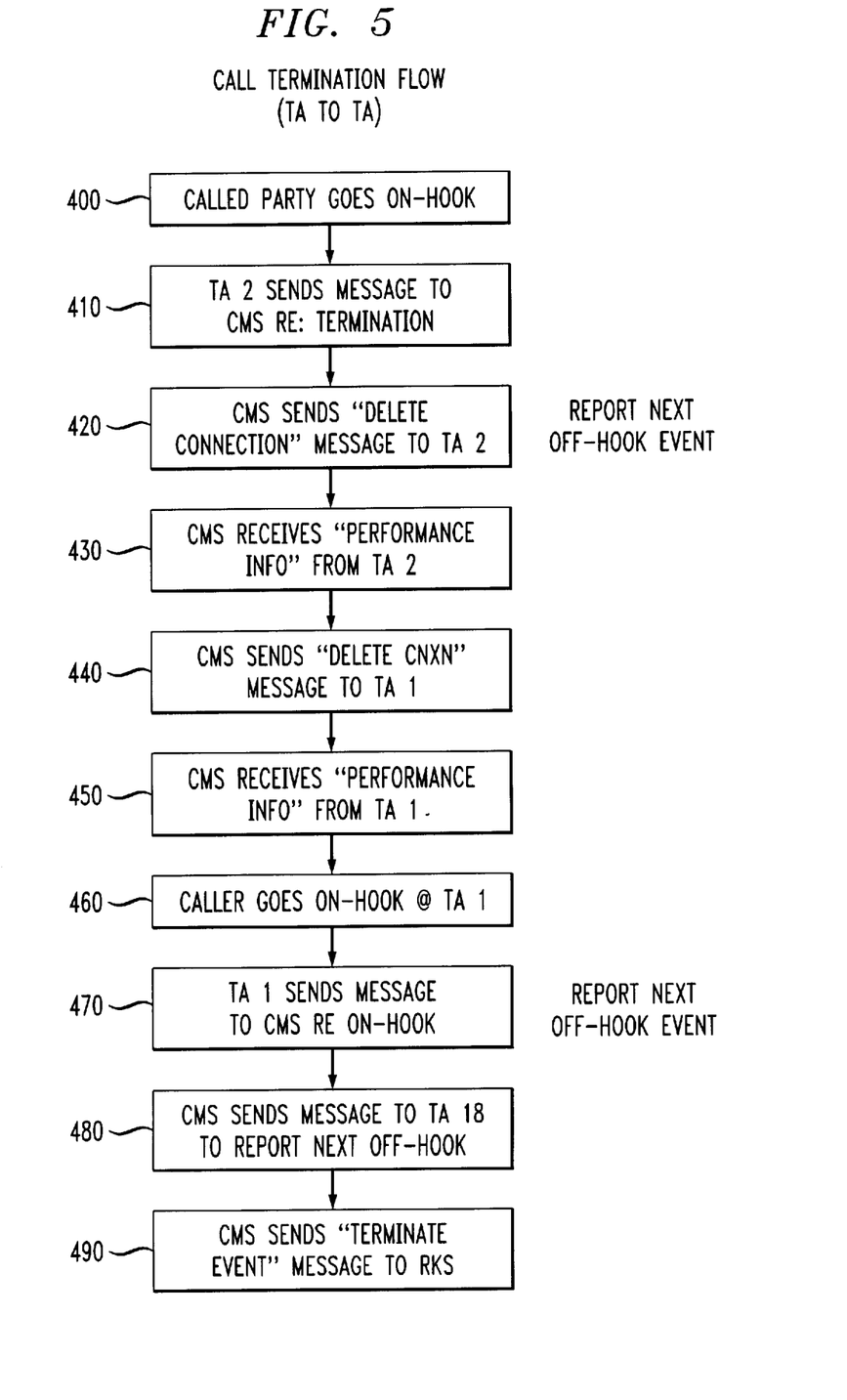
FIG. 5 contains a flowchart of an exemplary Packet Cable NCS standards process used to provide "call termination" between a first telephony adapter and a second telephony adapter.

FIG. 5 contains a flowchart of an exemplary process, using Packet Cable NCS call flow protocols, that may be followed in terminating a telephone call between a first TA (such as TA 18) and a second TA (such as TA 50). In this particular example, it is presumed that the called party (associated with TA 50) is the first to hang up (go "on-hook"), step 400. When the called party goes on-hook, TA 50 sends an MGCP message to CMS 12 (step 410) indicating that the call has been terminated. When this message is received, CMS 12 responds with an MGCP "delete connection" message that is sent back to TA 50 (step 420), where this message also includes an instruction for TA 50 to instruct CMS 12 of the next "off-hook" event. CMS 12 then receives the "call performance" information from TA 50 (step 430) and sends an MGCP "delete connection" message to TA 18 (step 440), instructing TA 18 to free up the resources used during call. In reply, CMS 12 receives the "call performance" information (step 450) from TA 18. The calling party associated with TA 18 then goes back on-hook (step 460), causing TA 18 to send a message to CMS 12 indicating the on-hook condition (step 470). In response, CMS 12 sends an MGCP message back to TA 18, requesting TA 18 to report the next "off-hook" event (step 480). To complete the call termination process, CMS 12 sends a "terminating event" message to the RKS.

Figure 6:
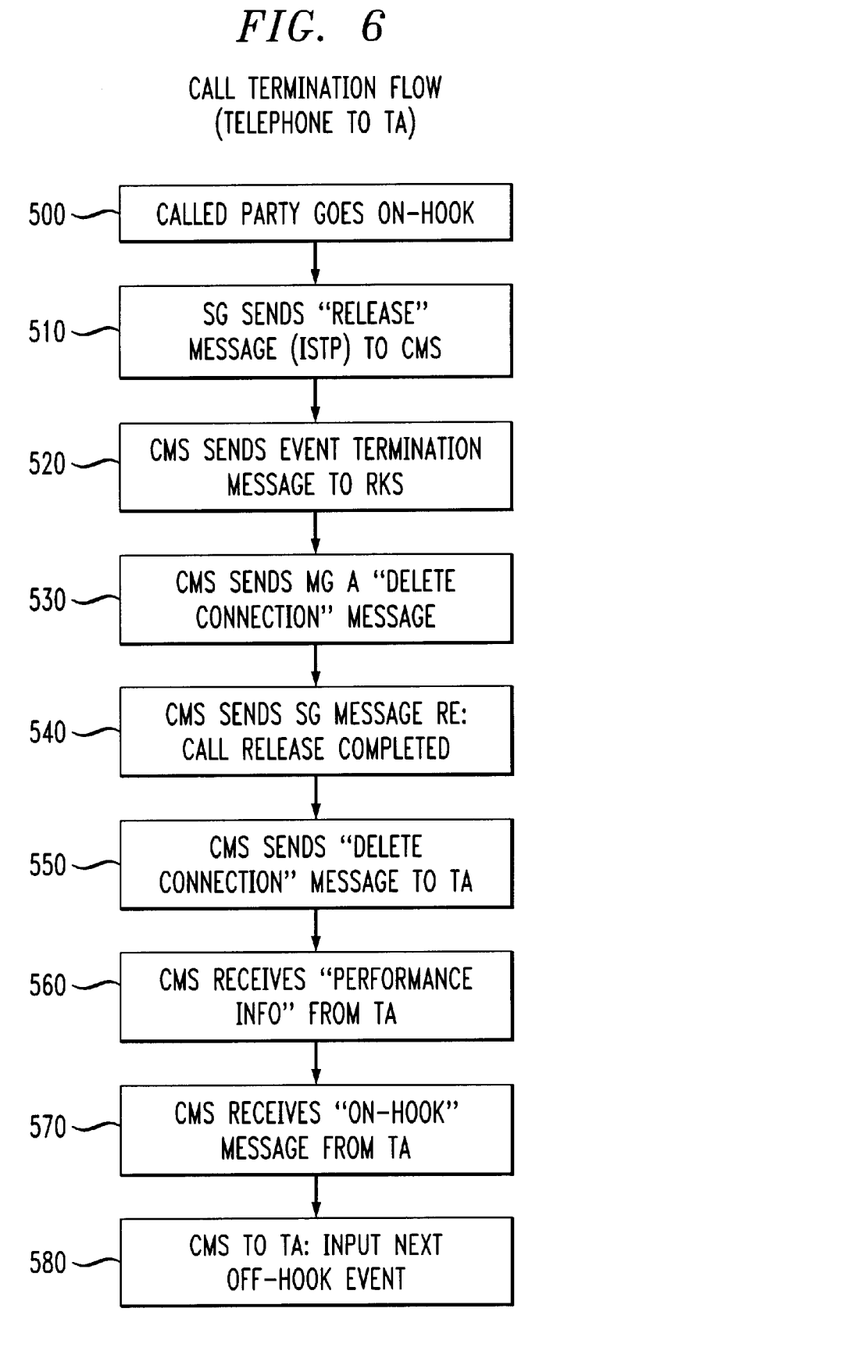
FIG. 6 contains a flowchart of an exemplary Packet Cable NCS standards process for providing "call termination" between a conventional telephone set and a telephony adapter in accordance with the present invention.

FIG. 6 contains a flowchart illustrating an exemplary call termination process to be used in accordance with the present invention to disconnect a calling party using a telephony adapter (TA) of the present invention from a conventional telephone set (i.e., an "on-net" to "off-net" call termination process), the particular illustrating in FIG. 6 associated with the use of Packet Cable NCS call flow protocol. In this example, it is presumed that the called party (using a conventional telephone) is the first party to hang up (i.e., on "on-hook"), as shown in step 500 of FIG. 6. When this occurs, the associated signaling gateway sends a "release" message to CMS 12 (step 510), including the identity of the TA (in this case, TA 18) involved in the telephone call. CMS 12, in turn, sends a "terminating event" message to the RKS 36 (step 520). Further, CMS 12 sends a TGCP "delete connection" message to the trunk gateway, instructing the trunk gateway to free up the resources that had been involved in this telephone call (step 530). CMS 12 also sends an "RLCX" message to the signaling gateway, indicating that the call release process has been completed (step 540). Once this has occurred, CMS 12 sends an MGCP "delete connection" message to TA 18 so as to release TA 18 from this call (step 550). In response, CMS 12 receives the "performance information" from TA 18 (step 560), as well as its "on-hook" message. CMS 12 then completes the process by sending an MGCP message back to TA 18 (step 570), instructing TA 18 to report its next off-hook event (step 580).

While this invention has been described in reference to illustrative embodiments, the description is not intended to be construed in a limiting sense. Various modifications and combinations of the illustrative embodiments, as well as other embodiments of the invention, will become apparent to persons skilled in the art upon reference or description. In particular, and as noted above, the DTA service of the present invention may be implemented using any standard VoIP signaling protocol, such as MGCP, NCS, SIP or the like. It is, therefore, intended that the appended claims encompass any such modifications or embodiments.

What is claimed is:

1. An arrangement for providing self-provisioned telecommunication service, the arrangement comprising
a telephony adapter device, coupled at a subscriber location to a conventional telephone, said telephony adapter coupled to both a telecommunications voice network and a data network, said telephony adapter identified unique information and used to establish both half-duplex and full-duplex telecommunication connections between the connected to conventional telephone and said telecommunications voice network; and
a provisioning database, coupled to the data network, said database comprising subscriber records for self-provisioned service, each record including a local telephone number associated with each subscriber and the unique MAC address of the associated telephony adapter.

2. The arrangement as defined in claim 1 wherein the telephony adapter unique information comprises a unique MAC address.

3. The arrangement as defined in claim 1 wherein the telephony adapter unique information comprises a unique security key.

4. The arrangement as defined in claim 1 wherein the arrangement further comprises a call management system coupled to the data network, said call management system used to provide a mapping between the local telephone numbers of each subscriber and an IP address to be used by the subscriber's telephony adapter to establish voice telecommunication.

5. The arrangement as defined in claim 4 wherein the arrangement further comprises a dynamic domain name server that communicates with the telephony adapter to maintain an updated translation between IP address and fully qualified domain name (FQDN) of each telephony adapter, the dynamic domain name server in communication with the call management system to providing updated IP address information to said call management system.

6. A method of provisioning dial-tone anywhere (DTA) telephone service using a telephony adapter device at a subscriber location, the telephony adapter device identified by unique information and connected to a conventional telephone and coupled to both a voice telecommunications network and a data network, the provisioning method comprising the steps of:

a) transmitting a standard DHCP discovery message from the telephony adapter to a data network DHCP;

b) receiving, at the telephony adapter, a public IP address;

c) transmitting a service request from the telephony adapter to a DTA provisioning server coupled to the data network, the request comprising the unique identifying information and the public IP address associated with the telephony adapter;

d) forwarding, from the DTA provisioning server to a dynamic domain name server, the unique identifying information and IP address of the telephony adapter;

e) transmitting a configuration file to the telephony adapter, the configuration file including the fully qualified domain name (FQDN) and port number of a DTA call management system;

f) transmitting, from the telephony adapter to the DTA call management system, an initiation request to begin telephony service using the addressed telephony adapter.

7. The method as defined in claim 6 wherein in performing step c), the MAC address of the telephony adapter is transmitted as the unique identifying information.

8. The method as defined in claim 6 wherein in performing step c), a security key associated with the telephony adapter is transmitted as the unique identifying information.

\* \* \* \* \*